United States Patent [19]
Daniel

[11] 3,757,431
[45] Sept. 11, 1973

[54] CRASH DUMMY CHEST STRUCTURE
[75] Inventor: Roger P. Daniel, Dearborn, Mich.
[73] Assignee: Ford Motor Company, Dearborn, Mich.
[22] Filed: Dec. 6, 1972
[21] Appl. No.: 312,769

[52] U.S. Cl. ................................................ 35/17
[51] Int. Cl. ........................................... G09b 23/32
[58] Field of Search .................... 35/17; 280/150 B, 280/150 SB

[56] References Cited
UNITED STATES PATENTS
3,557,471  1/1971  Payne et al. ............................ 35/17
3,664,038  5/1972  Searle et al. ............................ 35/17

Primary Examiner—Harland S. Skogquist
Attorney—Keith L. Zerschling and John J. Roethel

[57] ABSTRACT

An impact damping means is provided for the chest structure of an anthropomorphic dummy. The load-deflection of the chest structure is hydraulically controlled through a lever arm arrangement reacting on a viscous damping means.

9 Claims, 3 Drawing Figures

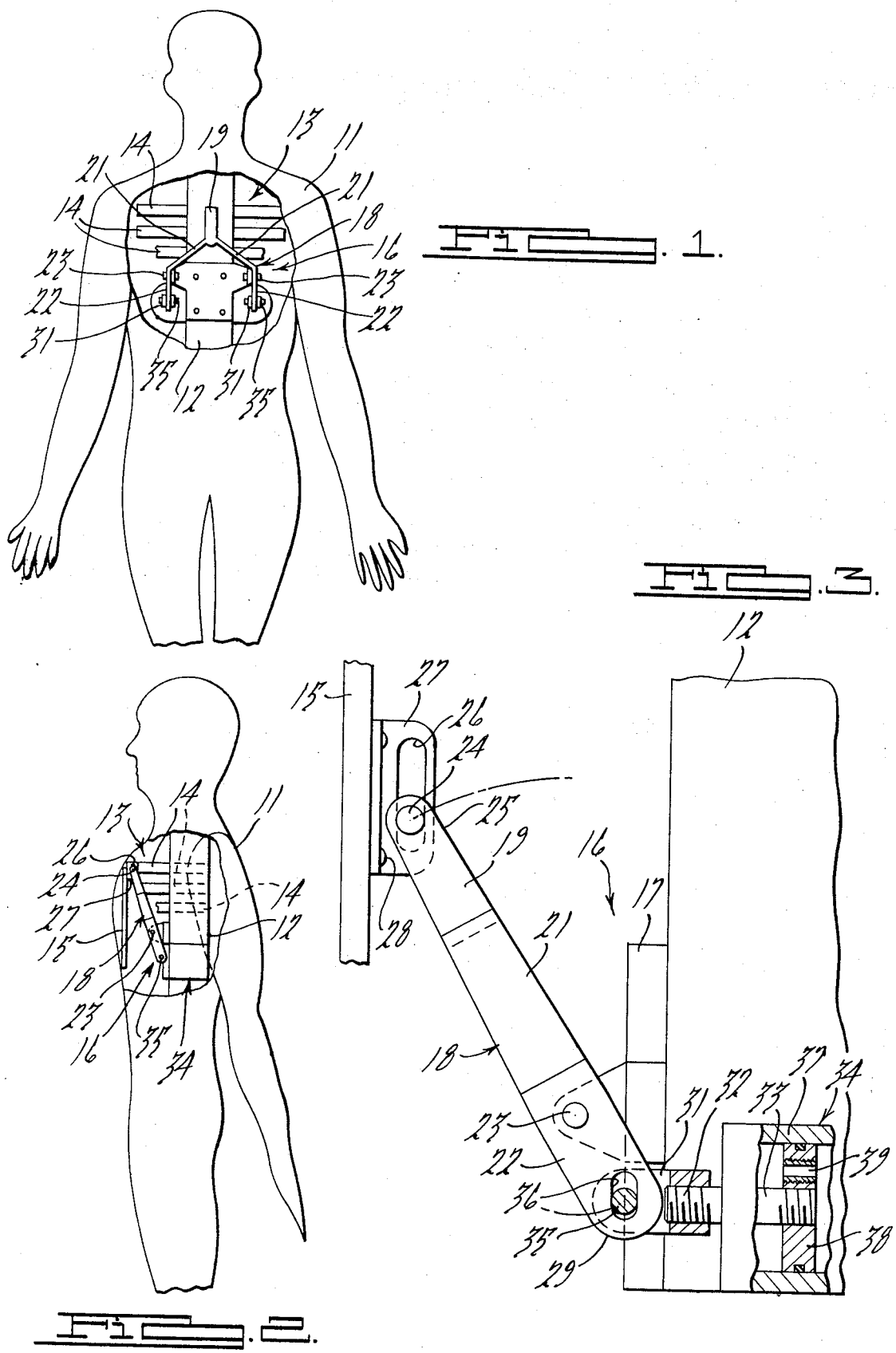

3,757,431

CRASH DUMMY CHEST STRUCTURE

BACKGROUND OF THE INVENTION

The chest biomechanics data that has been accumulated indicates that the load-deflection behavior of the human chest under impact loading is that of a spring plus a damper. Yet the chest structures of current crash test dummies exhibit the action only of a spring.

It is an object of the present invention to provide a crash test dummy having a chest structure embodying a combination spring-damper mechanism to more closely simulate the load-deflection behavior of the human chest.

SUMMARY OF THE INVENTION

This invention relates to an impact damping means for the chest structure of an anthropomorphic dummy having a simulated backbone, a simulated rib cage configuration formed of a plurality of resilient rib members projecting forwardly from the backbone, and a simulated sternum. The impact damping means comprises a fulcrum plate secured to the simulated backbone. A lever means is pivotally supported on the fulcrum plate and is pivotally coupled to the rear of the simulated sternum.

A viscous damping means is interposed between the lever means and simulated backbone. The viscous damping means resists at a controlled rate pivotal movement of the lever means caused by a substantially frontal impact force exerted on the dummy chest structure. The impact force is transmitted from the rib members through the sternum to the lever means. The rib members restore the lever means to its unimpacted position upon diminution of the impacting force.

DESCRIPTION OF THE DRAWING

Further features and advantages of the present invention will be made more apparent as this description proceeds, reference being had to the accompanying drawing, wherein:

FIG. 1 is a front view of an anthropomorphic dummy with a portion of the chest structure opened to illustrate the orientation of the impact damping means embodying the present invention;

FIG. 2 is a side elevation view of the anthropomorphic dummy; and

FIG. 3 is an enlarged view in part sectional of the impact damping means.

DETAILED DESCRIPTION OF THE INVENTION

Referring now to the drawing, FIGS. 1 and 2 represent front and side views of an anthropomorphic dummy 11 of a type used in vehicle crash testing. The present invention is concerned with the load-deflection characteristics of the dummy chest structure.

The anthropomorphic dummy has a simulated backbone structure 12 on which a simulated rib cage 13 configuration is supported. The rib cage 13 comprises a plurality of resilient or resiliently mounted rib members 14 attached by butyl rubber mounts (not visible) to the spine structure. The ribs at the front ends tie into a simulated sternum represented by the vertical member 15. The resilient or resiliently mounted rib members 14 provide the spring action of a rib cage configuration under chest load-deflection.

The impact damping means, generally designated 16, comprises a fulcrum plate 17 on which a substantially "Y"-shaped lever arm 18 is pivotally supported. The "Y" shaped lever arm has a center leg portion 19 from which two diverging leg portions 21 extend. Each leg portion 21 terminates in a short leg portion 22 paralleling the center leg portion. The "Y" shaped lever arm 19 is supported on the fulcrum plate by pivots 23 passing through the short leg portions 22 near the junction of the latter with the diverging leg portions.

The upper end of the lever center leg portion 19 is coupled by a pin and slot connection to the rear of the sternum 15 near the upper end of the latter. The pin 24 is fixed to the end 25 of the leg portion 19 for pivotal and slidable movement in a slot 26 in a bracket 27 secured by fasteners 28 to the sternum 15.

The lower ends 29 of the short leg portions 22 each have a pin and slot connection with a clevis 31 threaded on the end 32 of the piston rod 33 of a viscous damping means, generally designated 34. The pin 35 is fixed to the clevis 31 and is pivotal and slidable in a slot 36 in the leg portion end 29.

The viscous damping means 34 comprises a cylinder 37 housing a piston 38 carried on the piston rod 33. The cylinder is filled with a suitable viscous damping fluid which is able to flow at a controlled rate from one side of the piston to the other through a metering orifice 39 in the piston 38.

It will be understood that two viscous damping means are utilized, one being coupled to each of the leg portions 22 of the lever arm 18. Functionally, the lever arm 18 with its center leg 19, diverging legs 21 and short leg 22 extensions comprises a simple fulcrum lever having an effective long arm from the pivot 23 to the pin 24 and an effective short arm from the pivot 23 to the pin 35, as best seen in FIG. 3. In a prototype construction, a ratio of long arm to short arm of 3 ½:1 was found to be serviceable.

In operation, a blow to the dummy's chest causes inward movement of the rib members 14 which is transmitted through the sternum 15 to the upper end of the lever arm 18 causing the latter to swing about the fulcrum pivot 23. Movement of the lower end of lever arm 18 is resisted by controlled oil flow between the left and right sides (as viewed in FIG. 3) of the piston 38 within the cylinder 37. The springiness of the rib cage 13 plus the action of the viscous damping means 34 thus provides in the dummy the load-deflection characteristics of the human chest.

After the impact force on the dummy chest is terminated or expended, the springiness of the rib cage 13 acting in a reverse direction on the lever arm 18 restores the viscous damping means to its pre-impacted condition ready to receive the next blow.

It is to be understood that the invention is not limited to the exact construction illustrated and described above, but that various changes and modifications may be made without departing from the spirit and scope of the invention as defined by the following claims:

I claim:

1. Impact damping means for the chest structure of an anthropomorphic dummy having a simulated backbone, a simulated rib cage configuration formed of a plurality of resilient members projecting forwardly from the backbone, and a simulated sternum, the impact damping means comprising a fulcrum plate secured to the simulated backbone, lever means pivotally supported on the fulcrum plate, pivot means coupling the lever means to the rear of the simulated sternum, and viscous damping means interposed between the lever means and simulated backbone resisting at a controlled rate pivotal movement of the lever means caused by a substantially frontal impact force exerted on the dummy chest structure and transmitted to the lever means through the sternum, the rib members restoring the lever means to its unimpacted position upon diminution of the impacting force.

2. Impact damping means according to claim 1, in which:

the lever means comprises a lever arm pivotally supported intermediate its ends on the fulcrum plate.

3. Impact damping means according to claim 2, in which:

the lever arm has a long arm and a short arm, the end of the long arm away from the lever means fulcrum being coupled by the pivot means to the sternum.

4. Impact damping means according to claim 3, in which:

the pivot means coupling the lever means to the sternum is a pin and slot connection permitting relative pivotal and sliding movement between the long arm end and the sternum.

5. Impact damping means according to claim 4, in which:

the short arm of the lever means has a pin and slot connection with a piston rod of a viscous damping means, the viscous damping means comprising a fluid filled cylinder having a piston therein, the piston having an orifice therethrough for fluid flow at a controlled rate from one side of the piston to the other to achieve the damping action.

6. Impact damping means according to claim 1, in which:

the lever means comprises a substantially "Y"-shaped lever arm, the lever arm being fulcrummed on the fulcrum plate for swinging movement about a pivot axis contiguous to the ends of the diverging legs.

7. Impact damping means according to claim 6, in which:

the end of the center leg of the lever arm farthest away from the fulcrum pivot axis is coupled by the pivot means to the sternum.

8. Impact damping means according to claim 7, in which:

the pivot means comprises a pin and slot connection permitting relative pivotal and sliding movement between the end of the center leg and the sternum.

9. Impact damping means according to claim 8, in which:

the ends of the diverging legs of the lever arm each having pin and slot connections with piston rods of a pair of spaced viscous damping devices, each damping device comprising a fluid filled cylinder having an orifice therethrough providing a passageway for the controlled fluid flow from one side of the piston to achieve the damping action.

* * * * *